US007322070B2

(12) United States Patent
Zimmerle et al.

(10) Patent No.: US 7,322,070 B2
(45) Date of Patent: Jan. 29, 2008

(54) ANTI JAMMING DEVICE FOR A VACUUM HOSE

(75) Inventors: Johnny W. Zimmerle, St. Joseph, MI (US); Wyatt A. Cline, Niles, MI (US); Darren J. W. Gilikson, Sai Kung (HK); Simon P. Griffiths, Discovery Bay (HK)

(73) Assignee: Whirlpool Corporation, Benton Harbor, MI (US)

( * ) Notice: Subject to any disclaimer, the term of this patent is extended or adjusted under 35 U.S.C. 154(b) by 353 days.

(21) Appl. No.: 11/187,497

(22) Filed: Jul. 22, 2005

(65) Prior Publication Data

US 2007/0017058 A1 Jan. 25, 2007

(51) Int. Cl.
*A47L 9/26* (2006.01)

(52) U.S. Cl. .......................... 15/315; 15/323; 15/324; 242/334

(58) Field of Classification Search ................. 15/314, 15/315, 323, 324, 410; 242/334–334.6; 226/178, 226/188; *A47L 9/12; B65H 75/34*
See application file for complete search history.

(56) References Cited

U.S. PATENT DOCUMENTS

| | | | | |
|---|---|---|---|---|
| 3,911,944 | A * | 10/1975 | Hukuba et al. | 137/355.2 |
| 4,655,399 | A * | 4/1987 | Harvey | 239/745 |
| 5,740,581 | A * | 4/1998 | Harrelson, II | 15/314 |
| 5,740,582 | A * | 4/1998 | Harrelson, II | 15/315 |

* cited by examiner

*Primary Examiner*—David Redding

(74) *Attorney, Agent, or Firm*—Michael D. Lafrenz; Tara M. Hartman

(57) ABSTRACT

A vacuum system has a cabinet that can be mounted to a wall. The cabinet includes a hose connectable to a vacuum source. The hose is extendible from the cabinet between extended and retracted positions. A rotatable shaft drives the hose and a power source causes the rotatable shaft to rotate. A sensor measures the speed of rotation of the shaft and signals a controller to stop the power source when the speed falls below a predetermined threshold.

20 Claims, 20 Drawing Sheets

ANTI JAMMING DEVICE FOR A VACUUM HOSE

BACKGROUND OF THE INVENTION

1. Field of the Invention

The invention relates generally to vacuum systems, and more particularly to mechanisms for automatically driving vacuum hoses.

2. Description of the Related Art

Central vacuum systems where a vacuum hose can be reeled between extended and retracted positions are known. An example of such a hose driving system in a wall mounted central vacuum system is found in U.S. Pat. No. 5,740,581 to Harrelson, II. A problem with a driven hose in a vacuum system is that normal movement of the hose between extended and retracted positions can occasionally be obstructed, where the hose gets jammed. Continued driving of the hose in such conditions risks damaging the hose. There is a need to detect when a jam condition occurs so that the driving mechanism can be terminated. It is known to measure the torque on an electric motor that drives a vacuum hose, and stop the motor when torque exceeds a predetermined value, assuming that increased torque means that a jam condition has occurred. See, for example, the Harrelson, II '581 patent.

SUMMARY OF THE INVENTION

The present invention is embodied in a vacuum system comprising a cabinet adapted to be mounted to a wall. The vacuum system includes a hose connectable to a vacuum source and extendable from the cabinet between a retracted position where most of the hose is within the cabinet and an extended position where most of the hose is out of the cabinet. A rotatable shaft drives the hose between the retracted and extended positions, and a power source causes the rotatable shaft to rotate. A sensor is provided to measure the speed of the shaft as it rotates. The power source is disengaged from the rotatable shaft when the speed drops below a predetermined threshold while the hose is being extended or retracted and not at the retracted or extended positions.

Typically, the power source will be a motor. Preferably, the motor is reversible. The preferred sensor is a Hall effect sensor.

A hose storage compartment can be provided in the cabinet where the hose is stored when the hose is in the retracted position. Also, a retraction stop mechanism can be provided to limit retraction of the hose. In addition, or alternatively, an extension stop mechanism can limit extension of the hose.

Preferably, the retraction stop mechanism comprises a sleeve mounted to the hose and a limit switch mounted to the cabinet so that the sleeve will activate the limit switch to halt retraction of the hose. Similarly, the extension stop mechanism comprises a projection on the hose and a limit switch mounted to the cabinet so that the projection will activate the limit switch to halt extension of the hose.

In one aspect of the invention, a handle is mounted to the hose and is retained out of the cabinet when the hose is in the retracted position. The handle has a light, preferably, an LED. The handle can have a nozzle portion and a grip portion, with the nozzle portion angled relative to the grip portion. Ideally, the handle nests within a collar on a top wall of the cabinet, canted relative to the cabinet for ease of access.

In another aspect of the invention, a portable vacuum unit is detachably mountable to the cabinet and has a tank and an inlet port in fluid communication with the tank. The hose is connectable to the inlet port and the vacuum source is located in the portable vacuum unit to draw air from the inlet port into the tank. A portable vacuum hose can be mounted to the portable vacuum unit for use when vacuuming with the portable vacuum unit. Preferably, the portable vacuum unit has an outlet port, configured to receive a blower hose to direct air from the outlet port as a blower.

In a further aspect of the invention, the hose and the inlet port are automatically connected when the portable vacuum unit is docked to the cabinet. The cabinet has a power outlet and the portable vacuum unit receives power from the power outlet when it is docked with the cabinet. The portable vacuum unit has a power switch operable to actuate the vacuum source when the portable vacuum unit is detached from the cabinet, and a bypass mechanism to bypass the power switch when the portable vacuum unit is docked with the cabinet. Preferably, the vacuum source and the power outlet are automatically connected when the portable vacuum unit is docked with the cabinet.

In yet another aspect of the invention, the motor is operable in response to actuation of switches on the hose, and the switches can be in the handle. Preferably, the switches actuate the motor by wireless signals. In this embodiment, the hose has a transmitter and the cabinet has a controller with a receiver, the controller being electrically connected to the motor, so that signals from the switches are transmitted to the receiver for actuation of the motor by way of the controller. Further, the vacuum system can have a clutch mechanism to release the hose so that it can move independently of the power source.

DETAILED DESCRIPTION

Figure 1:
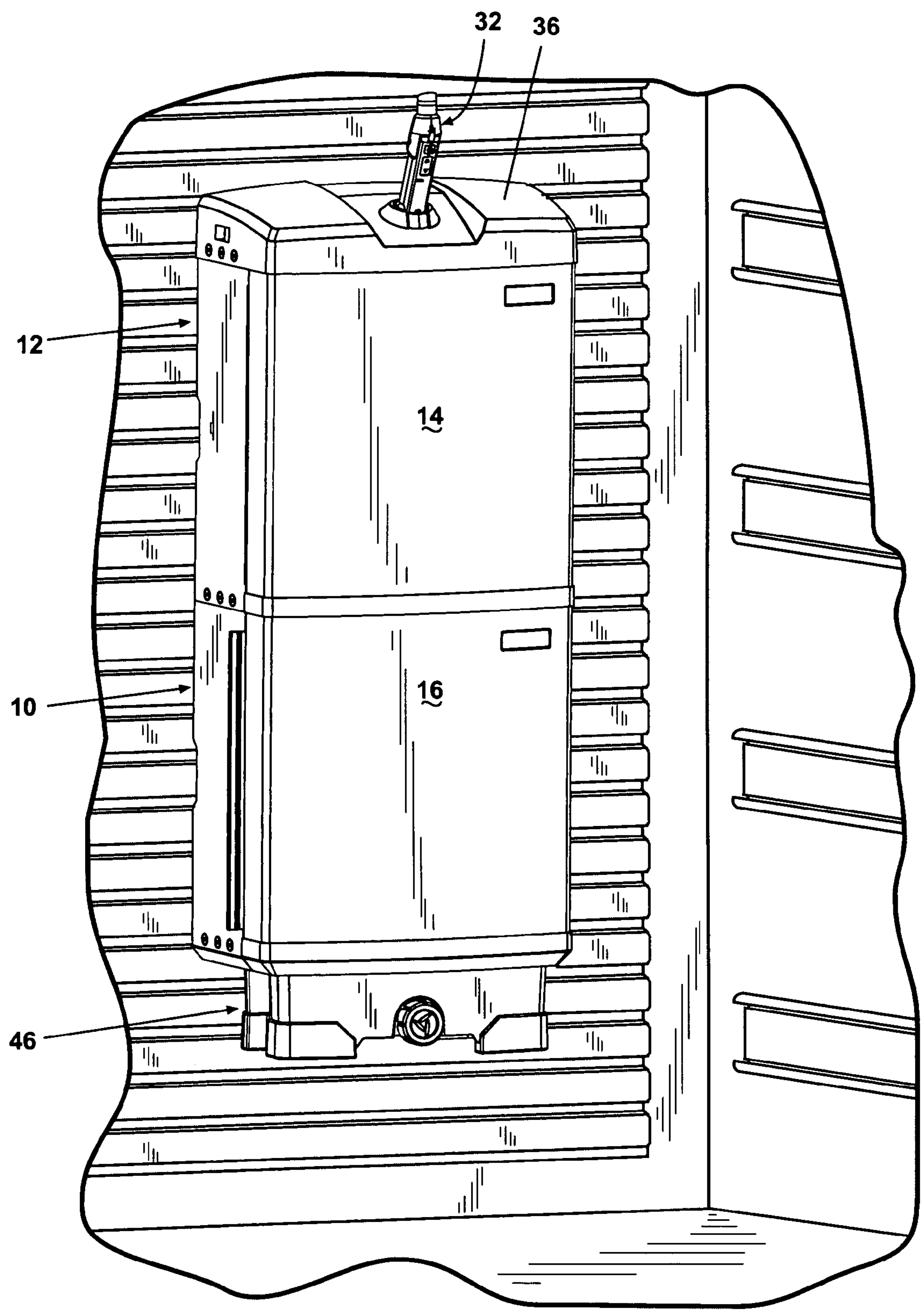
FIG. 1 is a perspective view of a vacuum system according to the invention mounted on a wall.
Figure 2:
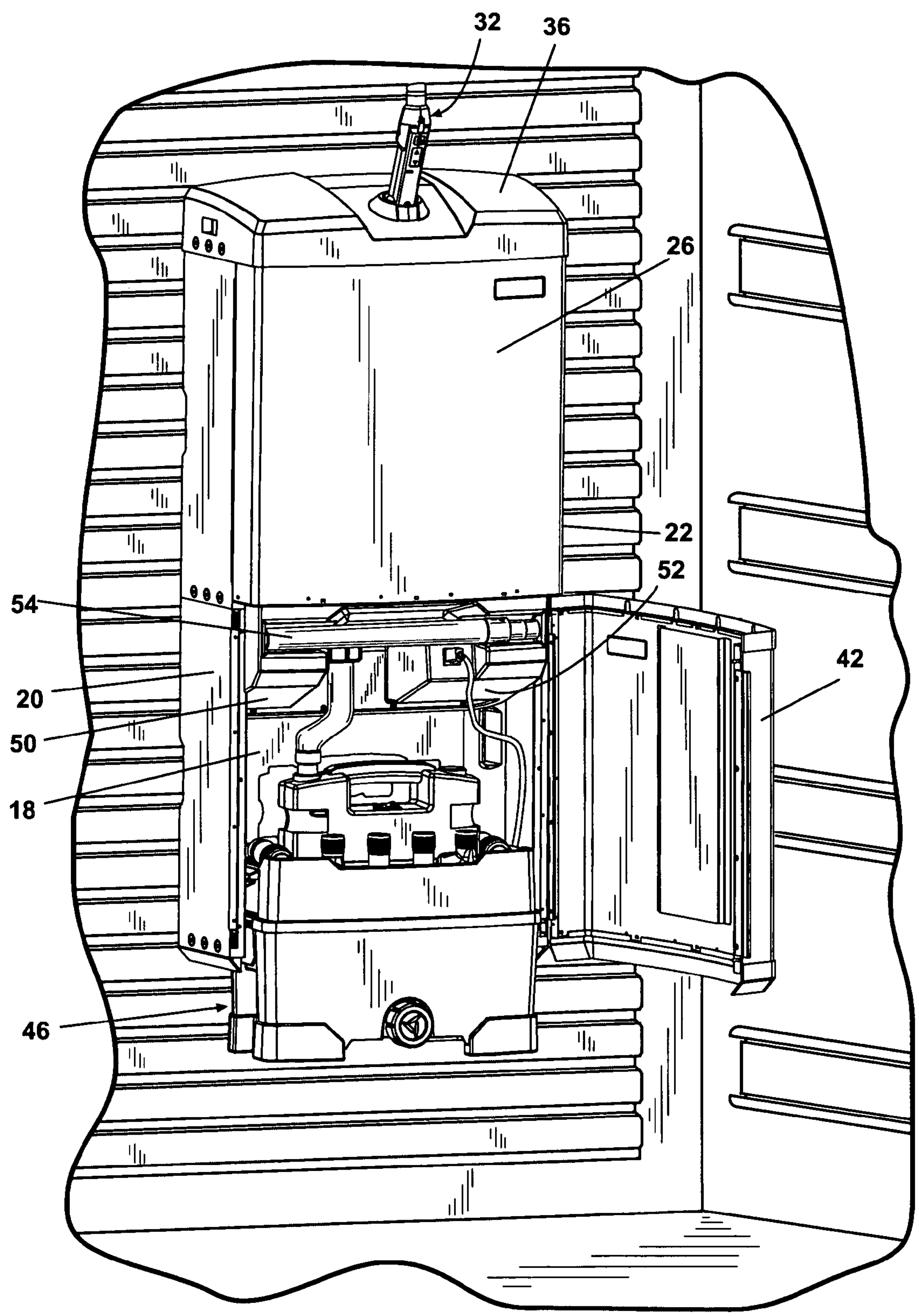
FIG. 2 is a perspective view of the vacuum system of FIG. 1 with the lower portion door open.
Figure 3:
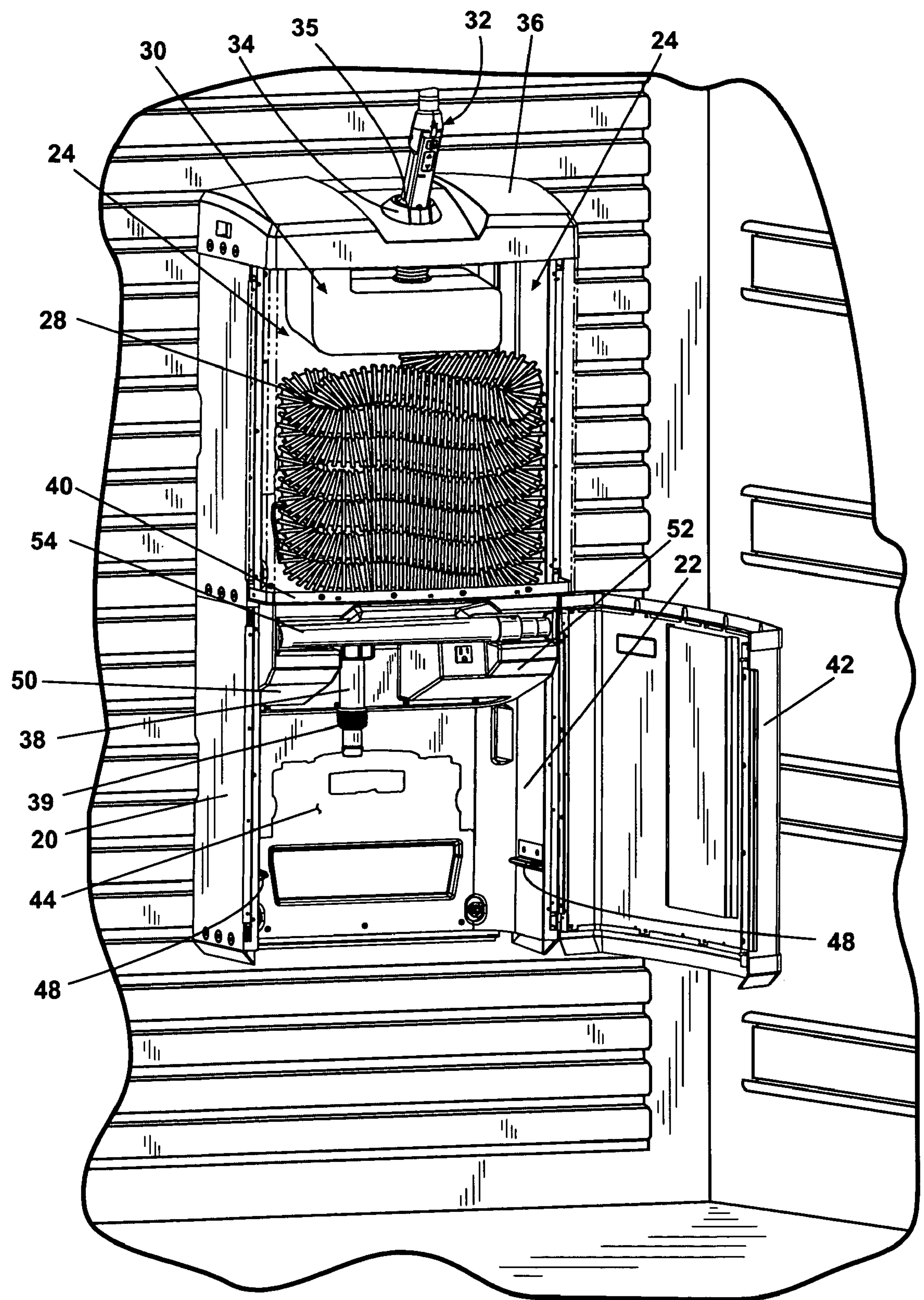
FIG. 3 is a perspective view of the vacuum system of FIGS. 1 and 2 with the upper portion panel shown in phantom.
Figure 4:
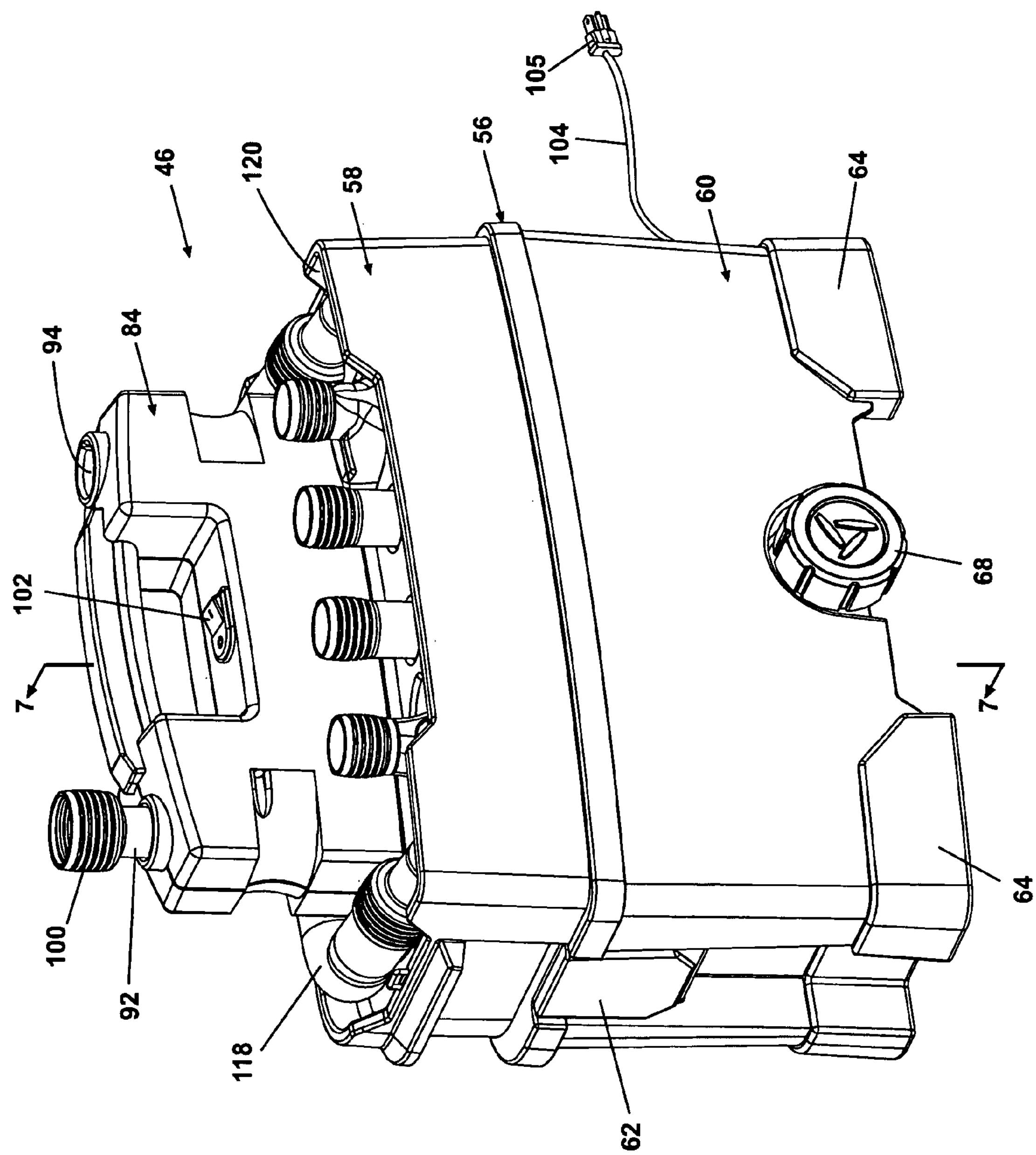
FIG. 4 is a perspective view of the portable vacuum unit of the vacuum system of FIG. 1.

The invention is embodied in a vacuum system 10 illustrated generally in FIGS. 1-3. The vacuum system 10 comprises a cabinet 12 adapted to be mounted on a wall. Here, the cabinet 12 is mounted on a slot wall construction of the type sold by Whirlpool Corporation under the Gladiator® trademark and disclosed in U.S. Pat. No. 6,811,043. The cabinet 12 comprises an upper portion 14 and a lower portion 16, both bounded by a rear wall 18 and opposed sidewalls 20, 22. The upper portion 14 houses a hose storage compartment 24 covered by a removable panel 26 which can provide access to the compartment.

Inside the storage compartment 24 is a considerable length of vacuum hose 28, preferably on the order of 40 feet in length. The vacuum hose 28 is typically corrugated or formed with a spiral rib, and may be extendable and compressible. The upper end of the vacuum hose 28 extends through a hose drive assembly 30 to a handle 32. The handle 32 nests within a collar 34 around an opening 35 in an upper wall 36 of the cabinet 12 with the vacuum hose 28 and/or handle 32 extending through the opening 35. The handle 32 is preferably canted relative to the cabinet when stored as shown. The lower end of the vacuum hose 28 fluidly communicates with a conduit 38 that projects into the lower portion 16 through a wall 40 that separates the lower portion 16 from the upper portion 14. A female coupler 39 can be provided on the end of the conduit 38.

The lower portion 16 has a door 42 that provides access to a lower compartment 44. The lower compartment 44 is also open at a lower end of the cabinet 12. A portable vacuum unit 46 is removably mountable to the cabinet 12 within the lower compartment 44. In this embodiment, a ledge 48 is mounted to each sidewall 20, 22 within the lower compartment 44. The portable vacuum unit 46 rests on the ledges 48 so that a portion of it is housed within the lower compartment, accessible by way of the door 42, and another portion of it extends through the open lower end of the cabinet 12. The cabinet 12 could just as easily be sized such that the portable vacuum unit is completely received within the interior of the cabinet.

The lower compartment 44 also houses one or more enclosures 50, 52 for supporting electrical circuitry and controllers that operate the hose drive assembly 30 and the portable vacuum unit 46 when it is mounted within the cabinet 12. In addition, the lower compartment 44 can also house additional vacuum attachments such as extension 54.

Preferably, the cabinet 12 will be mounted to a wall in a position so that the portable vacuum unit 46 will be more than 1½ to 2 feet off the floor. This is especially important in a garage where flammable vapors may accumulate closer to the floor. On the other hand, the cabinet 12 should not be mounted so high that the handle 32 is difficult to access. In this respect, it is within the scope of the invention for the handle 32 and the vacuum hose 28 to extend from the cabinet 12 at some point other than the top of the cabinet.

Figure 5:
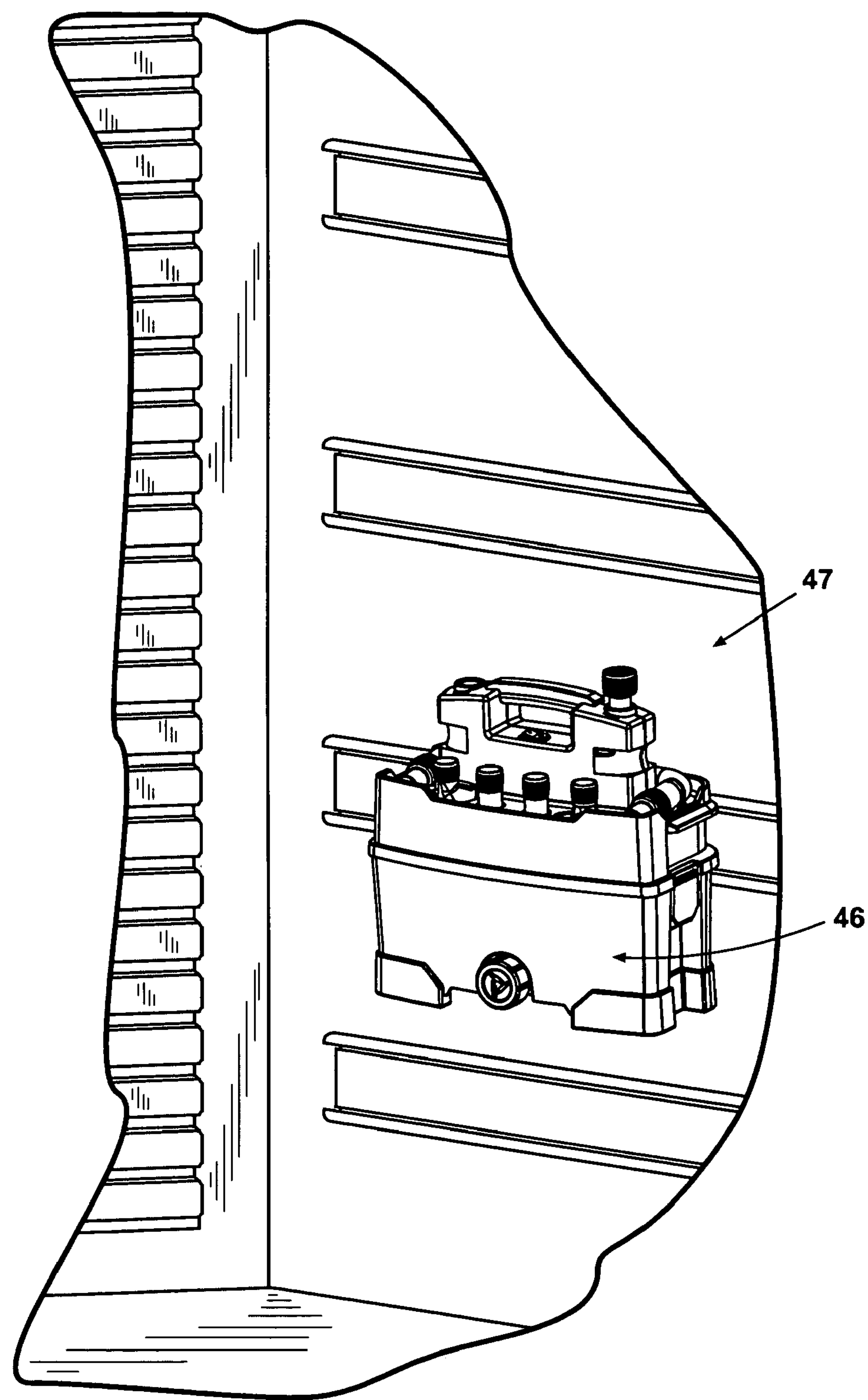
FIG. 5 is a perspective view of the portable vacuum unit of FIG. 4 mounted on a wall.

Turning now to FIGS. 4-7, the portable vacuum unit 46 is more clearly illustrated. The portable vacuum unit 46 comprises a platform 56 that supports a motor housing 58 above it and suspends a tank 60 beneath it. The tank 60 is removably mounted to the platform 56 by clips 62 or other conventional fasteners. The tank 60 will also preferably have feet 64 that will enable the portable vacuum unit 46 to rest stably on a horizontal surface. Preferably, the portable vacuum unit 46 will have some means to enable it to be hung separately on a wall 47 as shown in FIG. 5. Such means can include hooks or mating fasteners such utilized with the Gladiator® system, or something as simple as one or more receptacles to be received on corresponding wall-mounted hooks.

It will be appreciated that the portable vacuum unit 46 can function as a wet/dry vacuum, and therefore the tank 60 will have a drain 66 disposed at a lower portion thereof. The drain 66 will be sealed by a removable cap 68.

Figure 6:
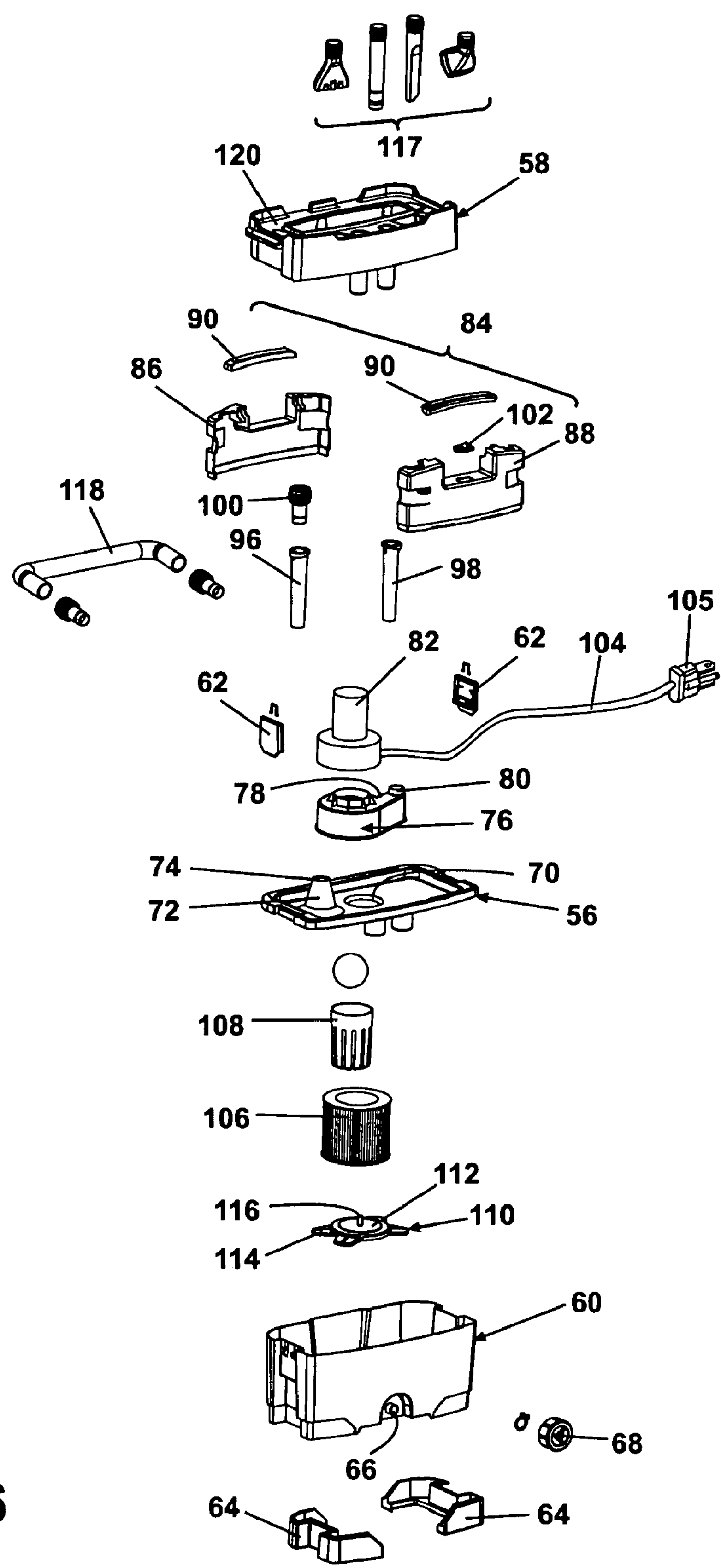
FIG. 6 is an exploded view of the portable vacuum unit of FIG. 4.
Figure 7:
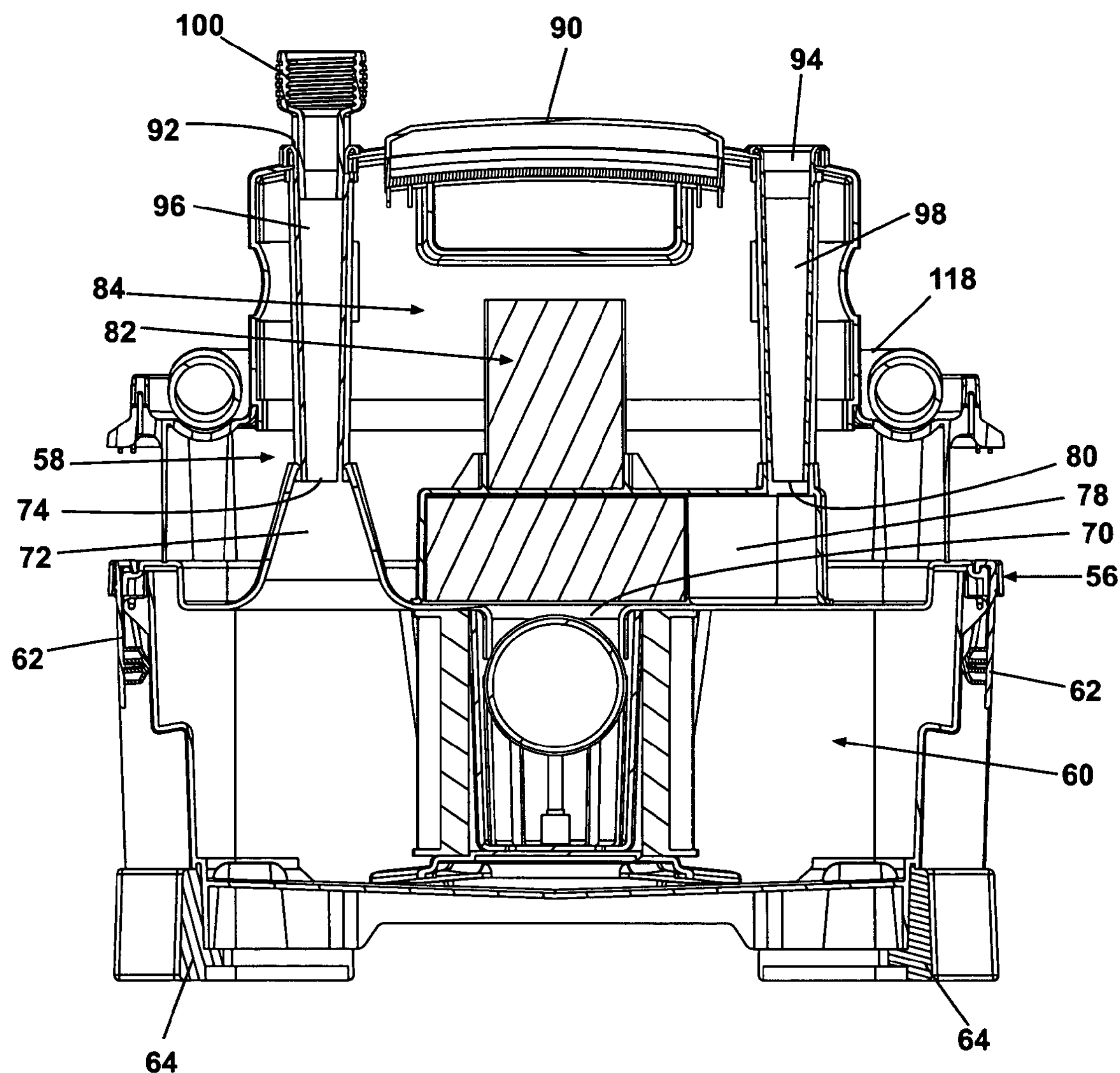
FIG. 7 is a cross-sectional view of the portable vacuum unit taken long line 7-7 of FIG. 4.

Referring primarily to FIGS. 6 and 7, the platform 56 has a centrally disposed outlet opening 70 and, to one side thereof, an upwardly extending cone 72. The upper end of the cone 72 defines an inlet opening 74. An impeller housing 76 is disposed over the outlet opening 70 and defines an exhaust channel 78 to an outlet opening 80 opposite the inlet opening 74. A vacuum motor 82 is positioned to drive an impeller within the impeller housing 76 in conventional manner. The motor housing 58 houses the inlet opening 74, the outlet opening 80, the impeller housing 76, and the vacuum motor 82.

A handle 84 extends upwardly from the motor housing 58, and may be formed of two clamshell halves 86, 88, and a bridge 90. One side of the handle 84 defines a vacuum port 92 and the other side of the handle defines a blower port 94. A vacuum conduit 96 extends from the vacuum port 92 to the inlet opening 74, and an exhaust conduit 98 extends from the outlet opening 80 to the blower port 94. A male adapter 100 extends out of the vacuum port 92 in fluid communication with the vacuum conduit 96. A power switch 102 is mounted in the handle 84 and is electrically connected to the vacuum motor 82. A conventional electrical cord 104 with plug 105 is also wired in conventional manner to the switch 102 and to the vacuum motor 82 to deliver power.

A cylindrical filter 106 depends from the platform 56 coaxially around the central outlet opening 70. Preferably, a longitudinally slotted support cup 108 is secured to the platform 56 around the central outlet opening 70. A leg assembly 110 comprising a central securing plate 112 and four radially extending legs 114 is secured to the support, cup 108 by a threaded bolt 116. The cylindrical filter 106 is securely retained between securing plate 112 and the bottom of the platform 56. It will be appreciated that the leg assembly 110 enables the platform 56, motor housing 58, handle 84, and all the components enclosed therein to stand upright on the leg assembly when the tank 60 is removed from the platform 56.

The motor housing 58 can further be adapted with various slots and cradles to support assorted tools and attachments 117 customarily used in vacuuming operations. For example, a separate onboard hose extension 118 rests in a cradle 120 around the handle 84. It is also within the scope of the invention for the portable vacuum unit 46 to be cordless, i.e., having an onboard rechargeable battery that can, for example, the automatically recharged when the portable vacuum unit is docked in the cabinet 12.

Figure 8:
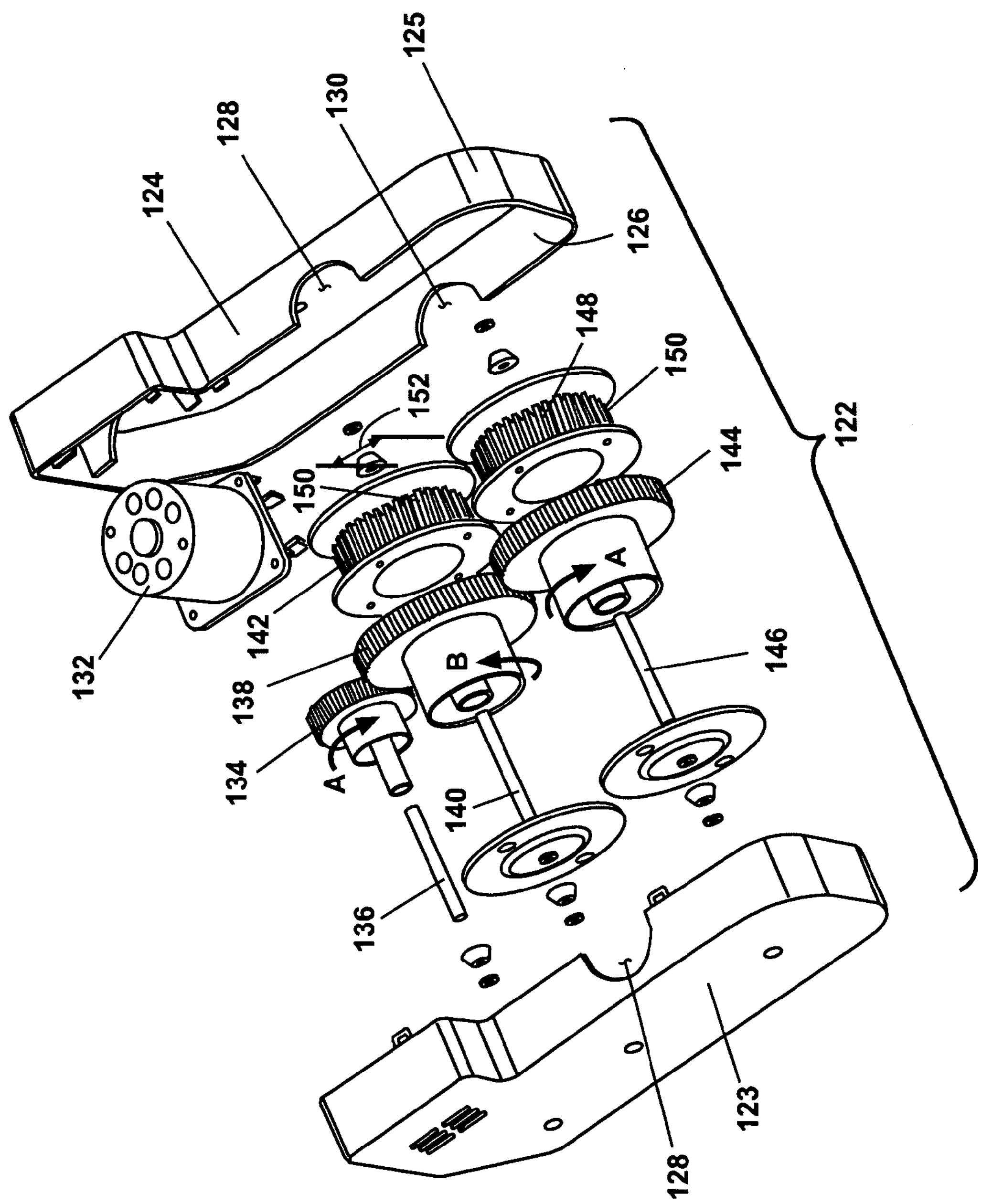
FIG. 8 is an exploded view of the gearbox in the hose drive assembly according to the invention.
Figure 9:
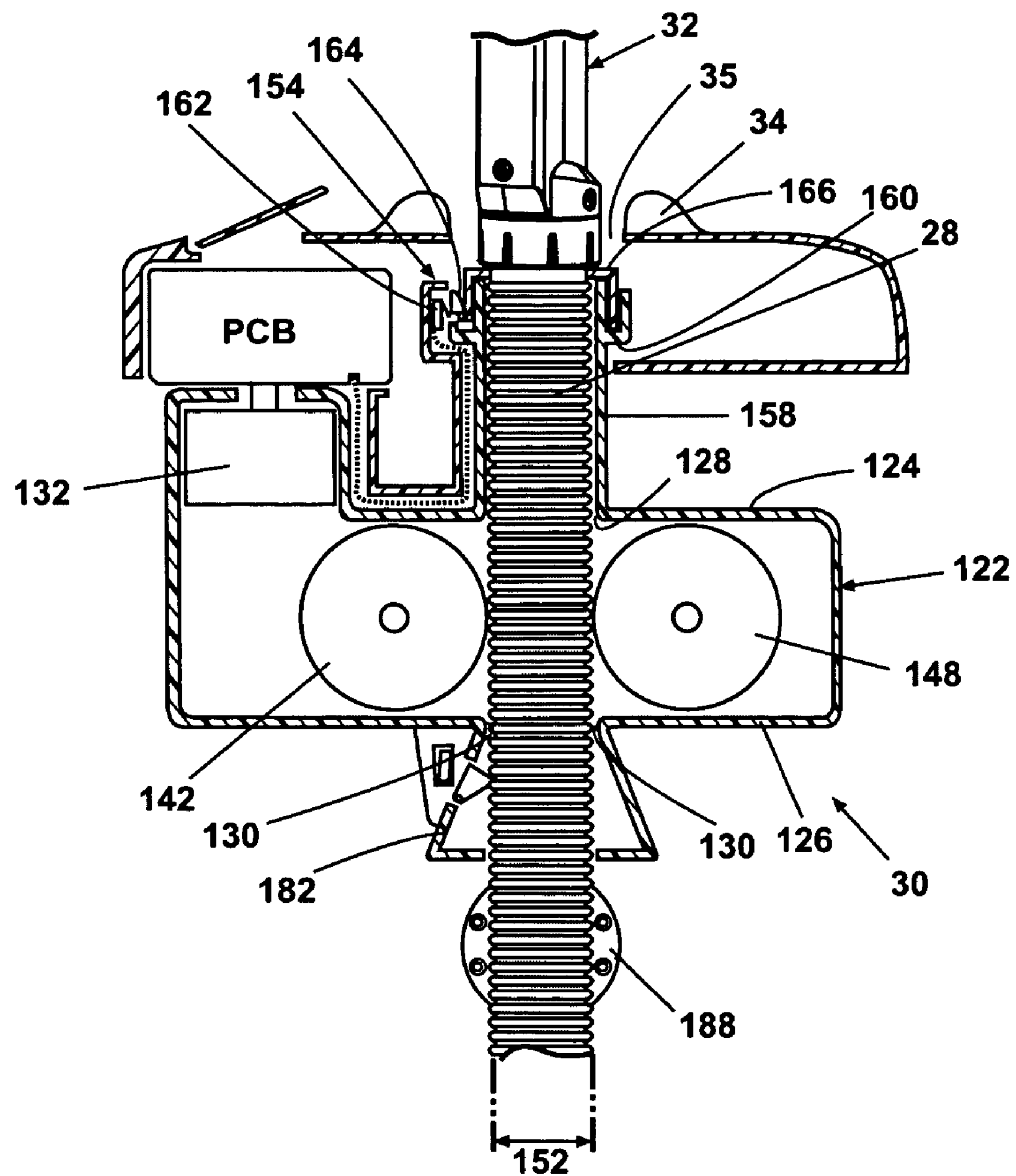
FIG. 9 is a partial cross-sectional view of the hose drive assembly showing the extension limit mechanism and a first embodiment of a retraction limit mechanism.
Figure 10:
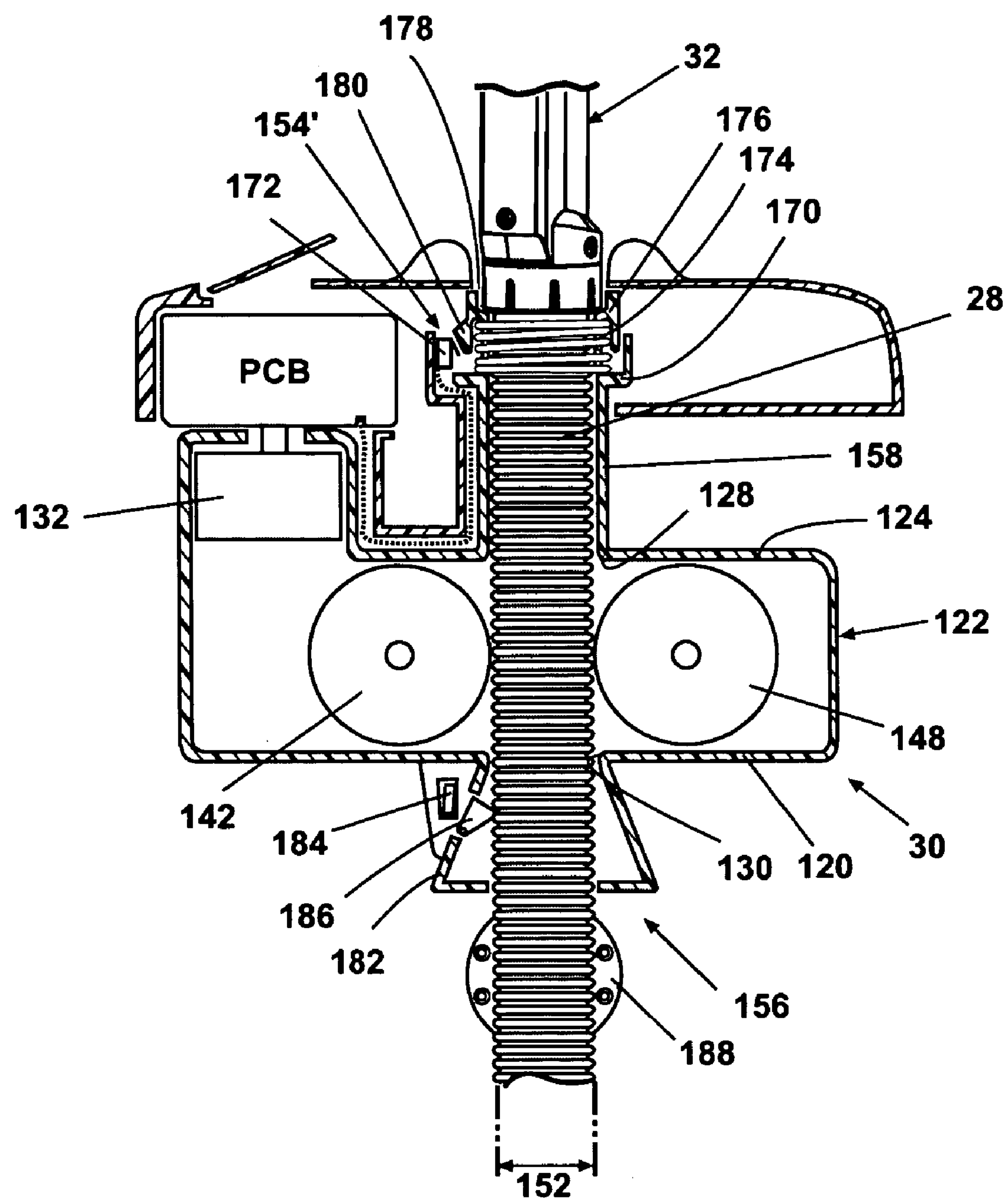
FIG. 10 as a partial cross-sectional view of the hose drive assembly showing the extension limit mechanism and a second embodiment of a retraction limit mechanism.

Turning now to FIGS. 8-10, the hose drive assembly 30 is illustrated in greater detail. The hose drive assembly 30 comprises a gearbox 122, preferably formed of two clam-shell halves 123, 125 that define an upper wall 124 and the lower wall 126. An aperture 128 in the upper wall 124 is located in registry with an aperture 130 in the lower wall 126. The diameters of the apertures 128, 130 are such that the vacuum hose 28 can extend through the gearbox 122 and move freely through the apertures in both directions. The gearbox 122 houses a reversible drive motor 132 having a shaft and a worm (not shown in FIGS. 8-10). A drive spur gear 134 mounted to a shaft 136 engages the worm to rotate when the reversible drive motor 132 is actuated. A first roller spur gear 138 is mounted to a shaft 140 and engages the drive spur gear 134. A first roller 142 is disposed to move with the first roller spur gear 138, preferably by either mounting to the first roller spur gear 138 or mounting to the shaft 140. A second roller spur gear 144 is mounted to a shaft 146 and engages the first roller spur gear 138. A second roller 148 is disposed to move with the second roller spur gear 144, preferably by either mounting to the second roller spur gear 144 or mounting to the shaft 146. The first and second rollers 142, 148 have recessed sheaves 150 that define a gap 152 between the rollers. The vacuum hose 28 extends between the apertures 128, 130 through the gap 152 so that the corrugations or ribs on the hose engage the sheaves 150 of the first and second rollers 142, 148.

It will be apparent that when the reversible drive motor 132 is actuated in an extending direction, the worm causes the drive spur gear 134 to rotate in the direction shown by the arrow A in FIG. 8. Similarly, rotation of the drive spur gear 134 causes the first roller spur gear 138 and the first roller 142 to rotate in the opposite direction shown by the arrow B in FIG. 8. In addition, rotation of the first roller spur gear 148 causes the second spur gear 144 and the second roller 148 to rotate in the same direction as the drive spur gear 134, shown by the arrow A. As the two rollers 142, 148 rotate in the indicated directions, the sheaves 150 bear against the corrugations or ribs to urge the vacuum hose 28 through the gap 152, through the opening 35 in the cabinet 12, and out of the hose storage compartment 24. Conversely, if the reversible drive motor 132 were to be actuated in a retracting direction opposite the extending direction, the two rollers 142, 148 will be urged to rotate in opposite directions from that indicated in FIG. 8, thereby urging the vacuum hose 28 into the storage compartment 24.

The hose drive assembly 30 further comprises a retraction stop mechanism 154 to stop the reversible drive motor 132 when the vacuum hose 28 reaches a predetermined retraction limit, preferably with the vacuum hose completely within the storage compartment 24, and the handle 32 nested within the collar 34. It also comprises an extension stop mechanism 156 to stop the reversible drive motor 132 when the vacuum hose 28 reaches a predetermined extension limit.

Exemplary embodiments of a retraction stop mechanism 154 and an extension stop mechanism 156 are illustrated in FIGS. 9 and 10. Looking at FIG. 9, a first embodiment of an retraction stop mechanism 154 includes a hose conduit 158 extending upwardly from the upper aperture in the gearbox 122, and terminates in an annular slot 160 at or beneath the collar 34. A limit switch 162, preferably in the form of a microswitch, is mounted within the storage compartment 24 adjacent the annular slot 160. A trigger 164 is mounted within the annular slot 160 and movable between a first position where it engages the limit switch 162 and a second position where it does not engage the limit switch. The trigger 164 is preferably biased to the second position. The upper end of the vacuum hose 28 near the handle 32 carries an annular sleeve 166 sized to be received within the annular slot 160. When the annular sleeve 166 is nested within the annular slot 160, it urges the trigger 164 to the first position where it engages the limit switch 162. The limit switch 162 is electrically connected to the reversible drive motor 132, preferably by way of a printed circuit board (PCB) that controls the drive motor operation in a manner that when the limit switch is engaged by the trigger 164 being in the first position, the reversible drive motor 132 is deactivated. In operation, as the vacuum hose 28 approaches its limit of retraction, the annular sleeve 166 is received within the annular slot 160 where it contacts the trigger 164, urging the trigger to the first position where it engages the limit switch 162 to deactivate the reversible drive motor 132.

Looking now at FIG. 10, a second embodiment of a retraction stop mechanism 154' includes a hose conduit 158 extending upwardly from the upper aperture 128 in the gearbox 122. The hose conduit 158 terminates in an annular cup 170. A limit switch 172, preferably in a form of a microswitch, is mounted within the annular cup 170. A compression spring 174 extends upwardly from the bottom of the annular cup 170 and surrounds but does not engage the vacuum hose 28. A sleeve 176 is secured to the upper end of the compression spring 174, and has an open socket 178 at an upper end thereof. A nub 180 depends from the sleeve 176 outside the compression spring 174 in line to engage the limit switch 172 when the compression spring 174 is compressed, but not engage the limit switch 172 when the compression spring 174 is uncompressed. The open socket 178 is sized to contact the lower end of the handle 32, yet to allow the vacuum hose 28 to move freely through it. In operation, as the vacuum hose 28 approaches its retraction limit, the lower end of the handle 32 contacts the open socket 178, and bears against the sleeve 176 causing it to compress the compression spring 174. As the spring 174 compresses, the nub 180 is urged into contact with the limit switch 172, deactivating the reversible drive motor 132.

The extension stop mechanism 156 includes an open cup 182 depending from the lower aperture 130 of the gearbox 122. A limit switch 184, preferably in the form of a microswitch, is mounted within the storage compartment 24 adjacent the open cup 182. A trigger 186 is mounted within the open cup 182 and movable between a first position where it engages the limit switch 184 and a second position where it does not engage the limit switch. The trigger 186 is preferably biased to the second position. A projection 188, preferably in the form of the spherical mounting on the exterior of the vacuum hose 28 is sized to enter the open cup 182 and move the trigger 186 to the first position as the vacuum hose 28 approaches its maximum extension, thereby engaging the limit switch 184. The limit switch 184 is electrically connected to the reversible drive motor 132, preferably by way of the PCB in a manner that when it is engaged, the reversible drive motor 132 is deactivated. Moreover, the size of the projection 188 is such that further extension of the vacuum hose 28 is prohibited by the contact the projection 188 with the open cup 182 or the lower aperture 130 of the gearbox 122.

It is within the scope of the invention for the retraction stop mechanism 154 or the extension stop mechanism 156, or both, to be utilized with a hose drive assembly 30 in any vacuum system, whether or not incorporated in the present embodiment. For example, they can be used in portable vacuum systems, wall-mounted vacuum systems, and central vacuum systems.

Figure 11:
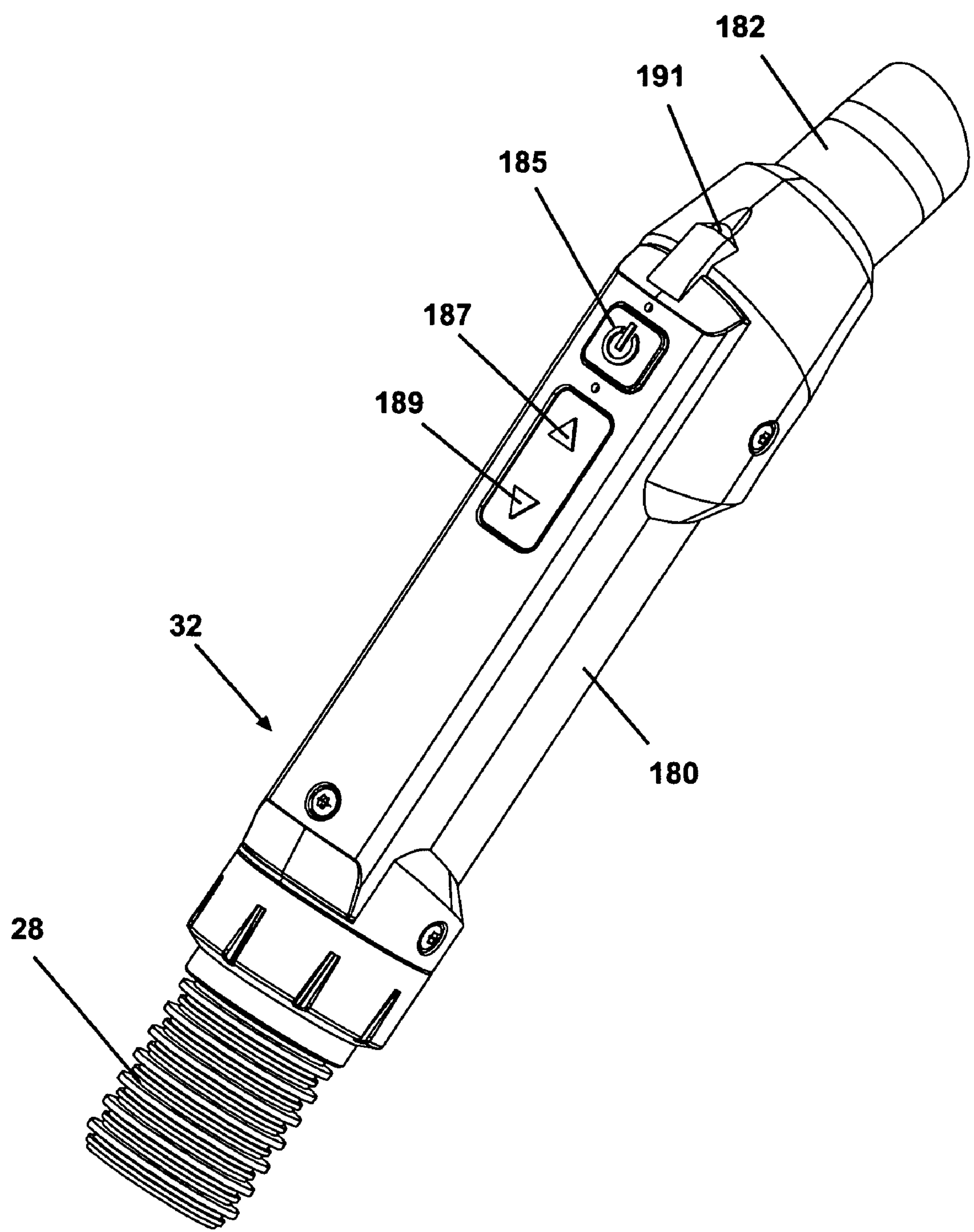
FIG. 11 is a perspective view of the handle.

Looking now FIG. 11, the handle 32 comprises a grip portion 180, and a nozzle portion 182. The nozzle portion 182 preferably extends an obtuse angle relative to the longitudinal axis of the grip portion 180. The nozzle portion 182 is also sized to frictionally receive one or more vacuum attachments 54, 117 either stored in the lower compartment or cradled in the portable vacuum unit 46.

It is contemplated that control of the vacuum motor 82 and control of the hose drive assembly 30 will be wireless from the handle 32. Thus, a transmitter enclosed in the handle 32 will transmit signals from an "on" switch to turn on the vacuum motor 82, and an "off" switch to turn off the vacuum motor 82, a "forward" switch to actuate the reversible drive motor 132 in the extending direction, and a "reverse" switch to actuate the reversible drive motor 132 in a retracting direction. There may also be an "off" switch to turn off the reversible drive motor 132 between the extension and retraction limits. In the present embodiment of the handle 32 illustrated in FIG. 11, the "on" switch and "off" switch for the vacuum motor 82 are encompassed in a single toggle key 185, the forward switch is actuated by a forward key 187, and the reverse switch is actuated by a reverse key 189. The "off" switch for the reversible drive motor 132 can be either a separate key, or preferably toggled from either the forward key 187 or the reverse key 189. Preferably, the RF frequency for transmission is 433 MHz, and the modulation method is ASK.

The handle 32 also has a light 191, preferably an LED, which activates whenever the "on" switch is activated. The light 191 is preferably directed in same direction as the nozzle 182 to provide illumination to the area to be vacuumed by the nozzle. It is within the scope of the invention for the handle light 191 to be utilized in any vacuum system, whether or not incorporated in the present embodiment. For example, it can be used in portable vacuum systems, wall-mounted vacuum systems, and central vacuum systems.

Figure 12:
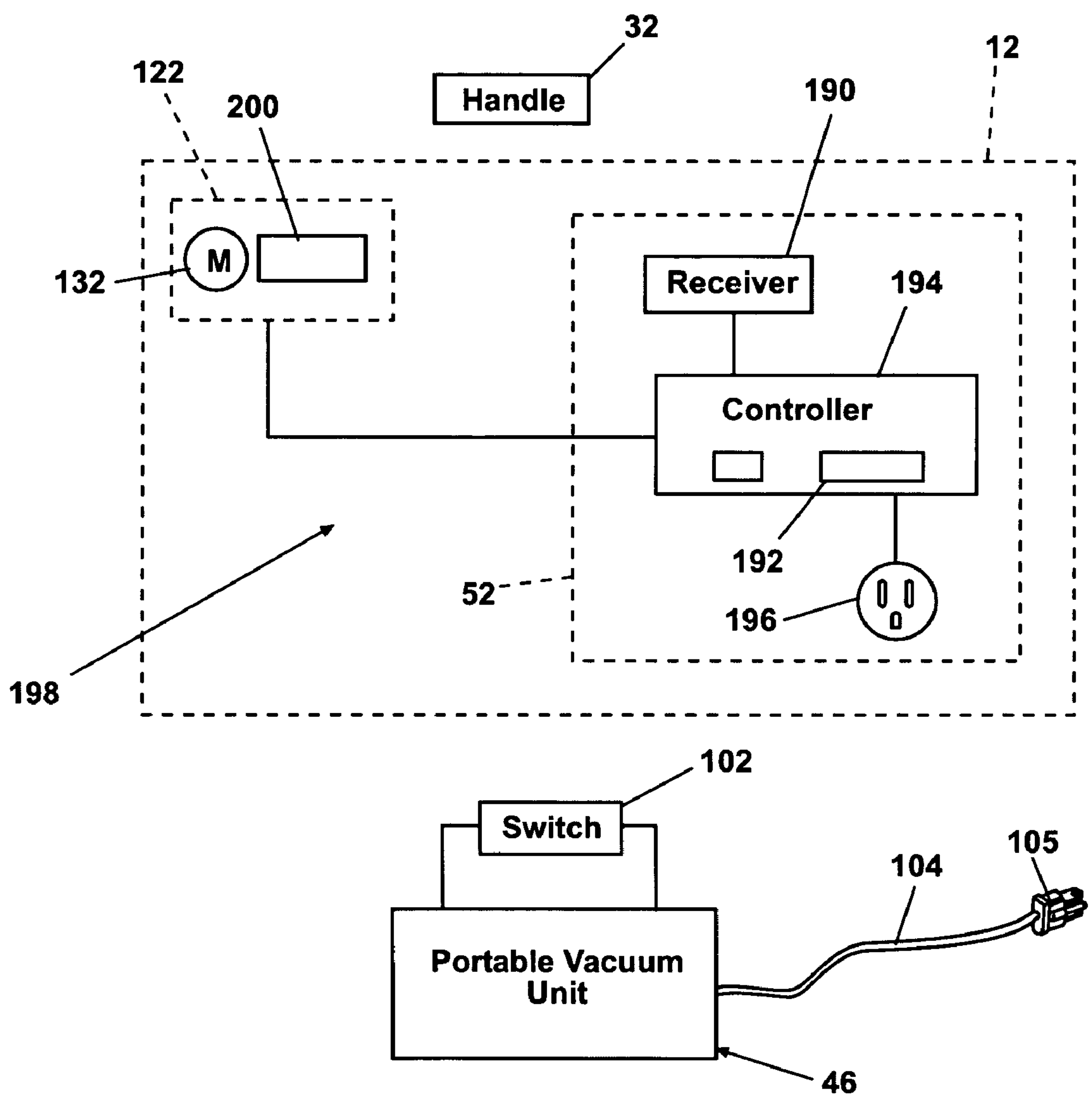
FIG. 12 is a schematic diagram showing the interaction of various components of the vacuum system according to the invention.
Figure 13:
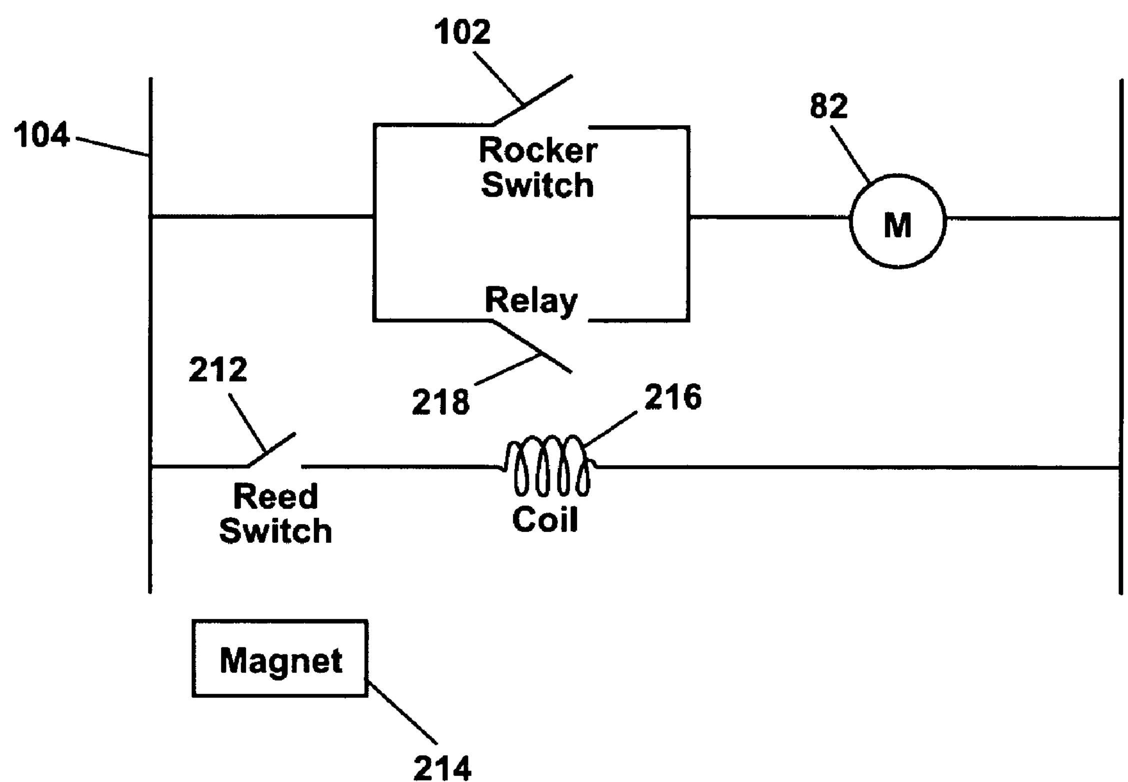
FIG. 13 is a schematic diagram of a bypass circuit for delivering power to the portable vacuum unit.
Figure 14:
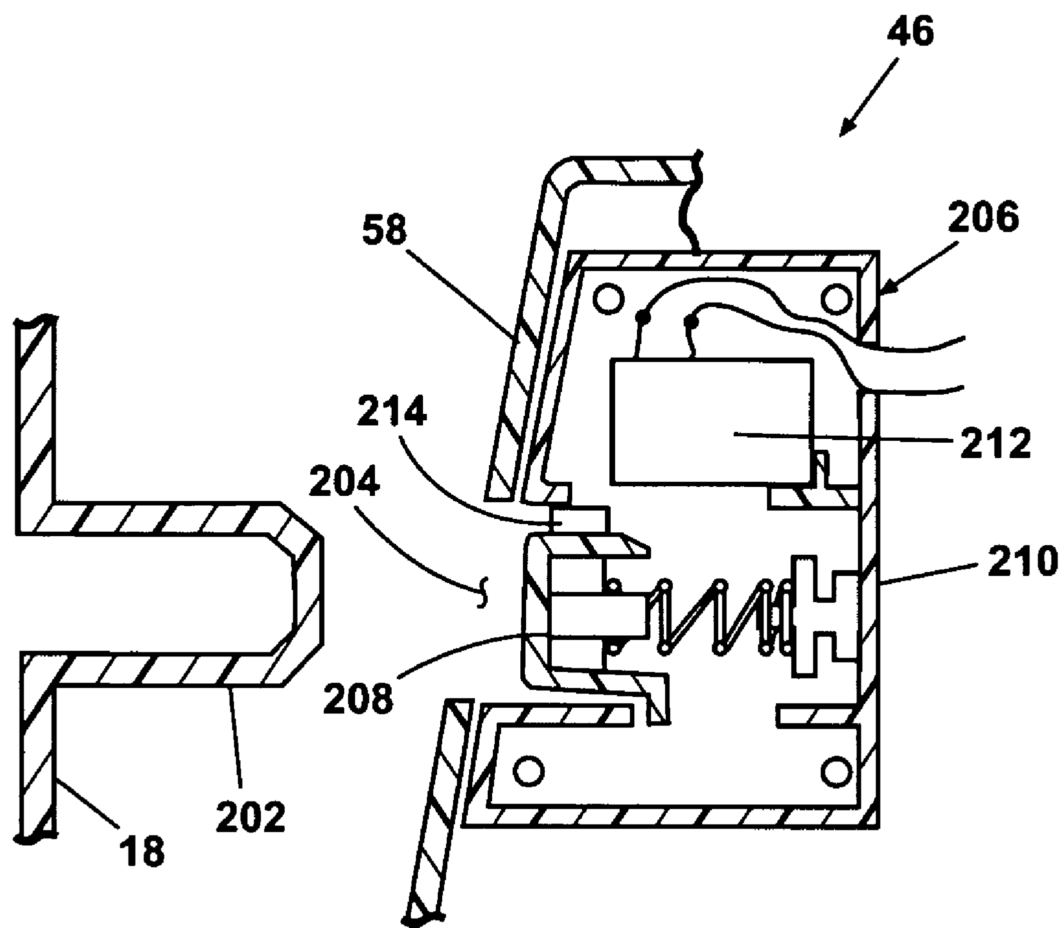
FIG. 14 is a cross-sectional view of a bypass mechanism for actuating the bypass circuit of FIG. 13.

Looking now also at FIG. 12, the electronic interaction among the various components is illustrated schematically. The cabinet 12 houses the gearbox 122, which includes the reversible drive motor 132. A receiver 190 is located in the cabinet 12, preferably in the enclosure 52. Also, a controller 194, preferably disposed in the enclosure 52 of the lower compartment 44, includes a processor 192. The controller 194 is electrically connected on the one hand to the gearbox 122 (preferably to the PCB connected to the reversible drive motor 132), and on the other hand to a power socket 196 also disposed in the enclosure 52. The handle 32 is connected to the cabinet 12 by way of the vacuum hose 28, but electrically, a wireless connection is preferred. The portable vacuum unit 46, as explained above, is a separate device. A user wishing to use the portable vacuum unit 46 apart from the cabinet 12 need only plug the electrical cord 104 into a conventional power socket using the plug 105, and turn on the power switch 102.

In this embodiment in order to use the portable vacuum unit 46 with the vacuum hose 28 of the cabinet 12, the user must do three things, manually, once the portable vacuum unit is installed in the cabinet: (1) connect the conduit 38 to the vacuum port 92, (2) plug the electrical cord 104 into the power socket 196, and (3) turn on the power switch 102. It will be understood that when the portable vacuum unit 146 is so docked, no power is delivered to the power socket 196; the portable vacuum unit is placed only in a condition of readiness for operation.

All control of the vacuum system 10 can thereafter be accomplished entirely from the handle 32. Pressing the toggle key 185 to actuate the "on" switch sends a coded signal to the receiver 190, whereupon the processor 192 decodes the signal and energizes the power socket 196. Conversely, pressing the toggle key 185 to actuate the "off" switch sends a coded signal to the receiver 190, whereupon the processor 192 decodes the signal and de-energizes the power socket 196. Similarly, pressing the forward key 187 sends a coded signal to the receiver 190, whereupon the processor 192 decodes the signal and turns on the reversible drive motor 132 in the extending direction. The vacuum hose 28 will be automatically extended from the hose storage compartment 24 during actuation of the hose drive assembly 30, and the user can guide the extension of the hose with the help of the handle 32 to the fully extended position, whereupon the hose drive assembly 30 will be shut off by the extension stop mechanism 156. If the user wanted the vacuum hose 28 to be partially extended, pressing the forward key 187 again will stop the hose drive assembly 30. By continually pressing the forward key 187 or the reverse key 189, as needed, the user can position the vacuum hose 28 is desired.

It is within the scope of the invention for the forward key 187 and the reverse key 189 to provide continuous activation of the hose drive assembly 30. In other words, as long as the forward key 186 is pressed between the extension and retraction limits, the reversible drive motor 132 will be energized in the extension direction. When the forward key 187 is released, the reversible drive motor 132 will be shut off. Similarly, as long as the reverse key 189 is pressed between the extension and retraction limits, the reversible drive motor 132 will be energized in the retraction direction. When the reverse key 189 is released, the reversible drive motor 132 will be shut off. In any event, it is contemplated that when the vacuum hose 28 is fully retracted and the limit switch 162 or 172 is actuated, the reverse key 189 will be inoperative so as to prevent damage to the hose. Similarly when the vacuum hose 28 is fully extended and the limit switch 184 is actuated, the forward key 187 will be inoperative so as to prevent damage to the hose. In order to stabilize operation of the reversible drive motor 132, a step start of the motor is initiated preferably within the first second of actuation.

To prevent damage to the vacuum hose 28 and to the hose drive assembly 30 in the event the vacuum hose 28 becomes jammed during extension or retraction, an anti-jamming circuit 198 is provided. In the anti-jamming circuit 198, a Hall effect sensor 200 is disposed in the gearbox 122 near a magnetic ring on the shaft of the reversible drive motor 132. The Hall effect sensor 200 monitors the speed of the reversible drive motor 132 and sends a signal indicative of the speed to the processor 192. The processor 192 is programmed to recognize a lower limit of normal speeds for the reversible drive motor 132, say 3000 rpm. It is assumed that if the motor speed drops below 3000 rpm when neither an "off" switch nor a limit switch is activated, there is a jammed condition, and the controller 194 will turn off the reversible drive motor 132. Preferably, the controller 194 will permit the system to reset to an operative condition only when the jamming problem is resolved.

Any one or all of the three manual operations for connecting the portable vacuum unit 46 to the cabinet 12 can be automated. For example, a mechanism can be provided to automatically bypass the power switch 102 when the portable vacuum unit 46 is mounted to the cabinet 12, thereby obviating the need to turn on the power switch. Two variations of such a mechanism are illustrated in FIGS. 13-16. In the first variation shown in FIGS. 13 and 14, a protrusion 202 extends from the rear wall 18 of the cabinet 12. Some portion of the portable vacuum unit 46, preferably the motor housing 58 has an aperture 204 sized to receive the protrusion 202. A switch module 206 is disposed immediately behind the aperture 204 and comprises a button 208 movably connected to a wall 210. A reed switch 212 is mounted adjacent to the path of movement of the button 208. The button 208 carries a magnet 214, and is biased to a position where the magnet 214 is not adjacent the reed switch 212, yet is positioned to contact the protrusion 202 when the protrusion is received in the aperture 204.

As the portable vacuum unit 46 is mounted in the cabinet 12, as for example by resting on the ledges 48 as explained above, the motor housing 58 is brought near the rear wall 18 of the cabinet 12. The aperture 204 is located such that it goes over the protrusion 202. Simultaneously as the protrusion 202 extends through the aperture 204, it bears against the button 208, and urges the button to move against its bias toward the wall 210. As the button 208 moves, the magnet 214 passes the reed switch 212, activating it. Actuation of the reed switch 212 energizes a coil 216 that, in turn, triggers a relay 218 to close a circuit between the electrical cord 104 and the vacuum motor 82. Thus, upon placement of the portable vacuum unit 46 within the cabinet 12, the user need not perform the manual operation of turning the power switch 102 on because the power switch is effectively automatically bypassed by triggering the relay 218.

Figure 15:
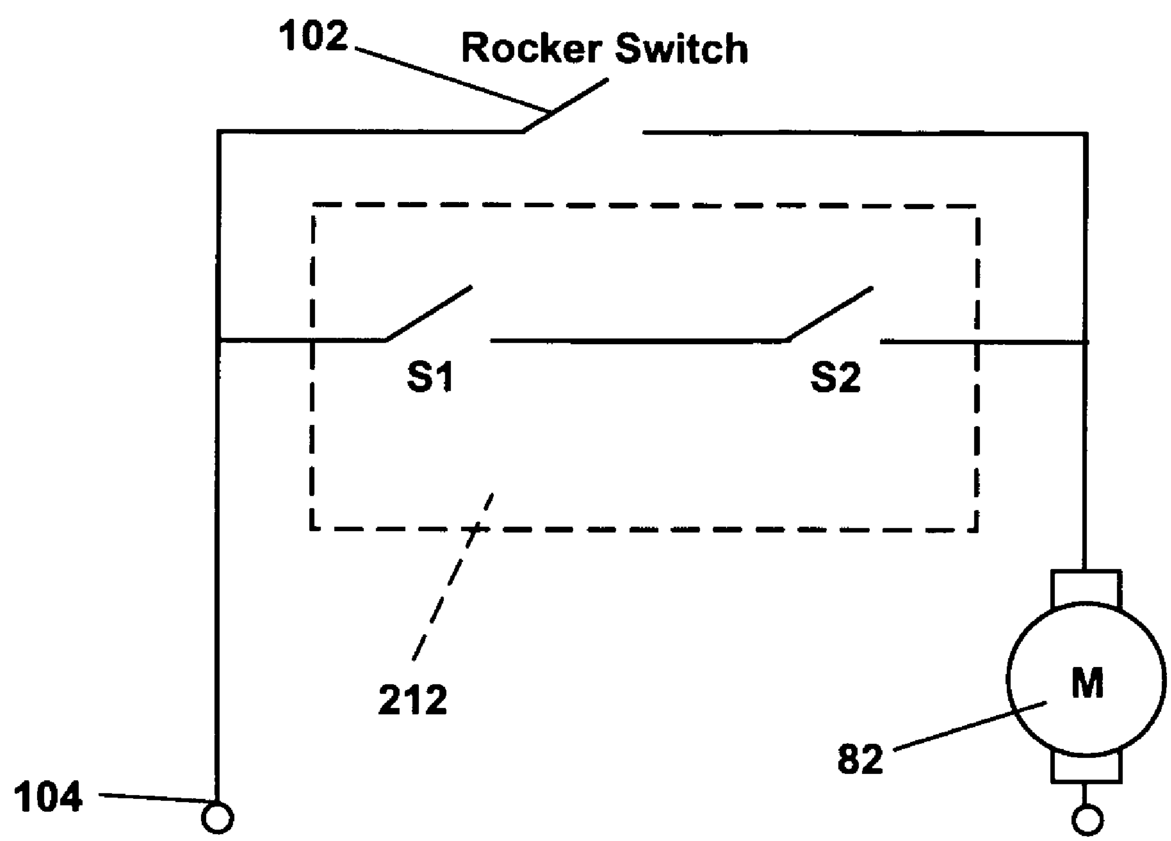
FIG. 15 is a schematic diagram of an alternative bypass circuit for delivering power to the portable vacuum unit.
Figure 16:
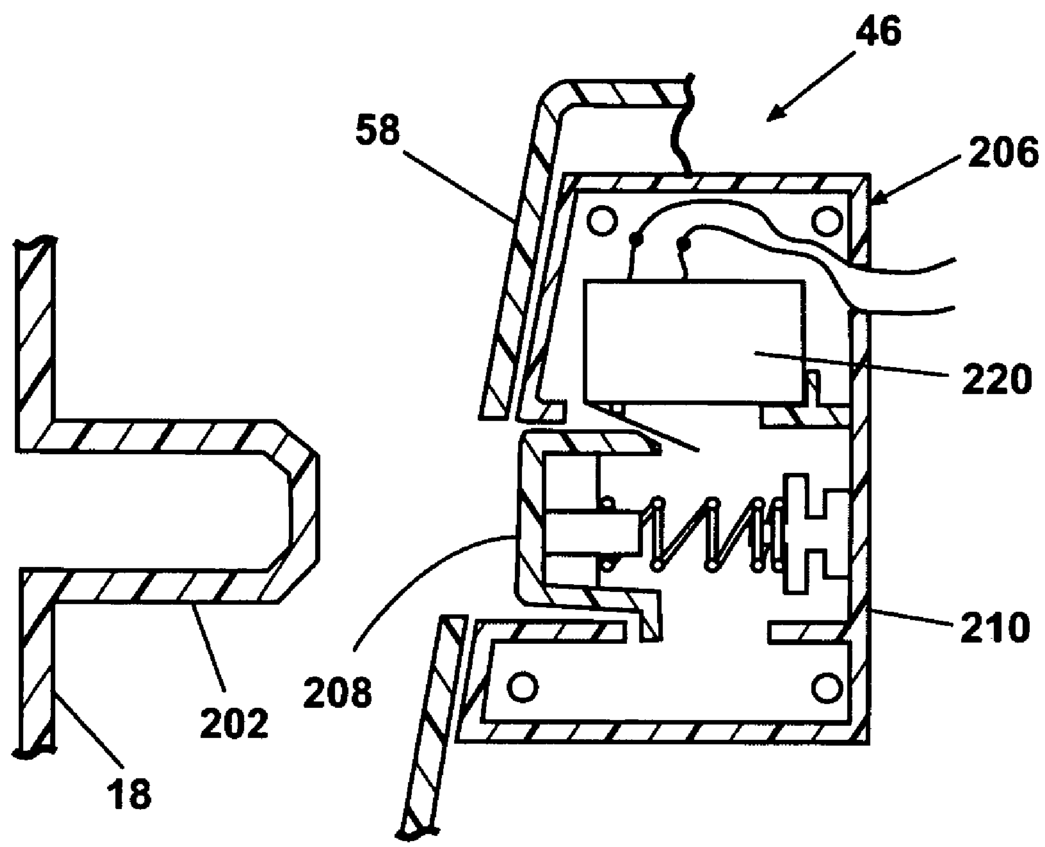
FIG. 16 is a cross-sectional view of a bypass mechanism for actuating the bypass circuit of FIG. 15.

An alternative to the aforementioned bypass circuit is shown in FIGS. 15-16 where like components bear like reference numerals. The difference in this circuit is that instead of using the more complex magnetically operated reed switch with coil and relay, a simple microswitch 220 is mechanically actuated by the button 208.

Figure 17:
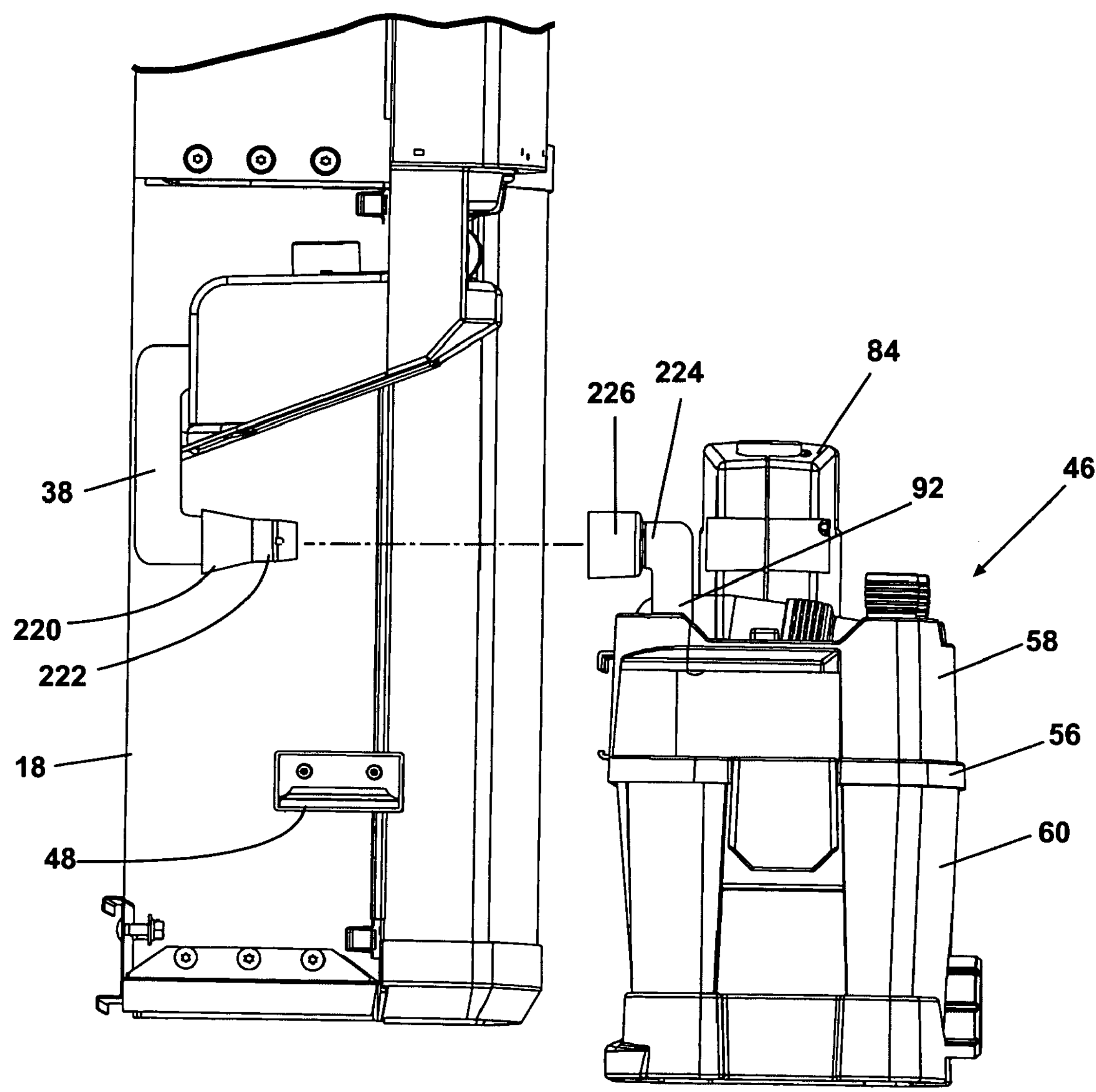
FIG. 17 is a side view, partly in cross-section, of an alternative hose connection between the portable vacuum unit and the cabinet.

Another manual operation the can be automated is connecting the conduit 38 to the vacuum port 92. An example of a structure to accomplish this operation is shown in FIG. 17. The conduit 38 extending from the vacuum hose 28 into the lower compartment 44 has an extension 220 projecting outwardly from the rear wall 18. A female coupler 222 is located on the end. The portable vacuum unit 46 has a conduit 224 extending rearwardly from the vacuum port 92 on the end of which is a male coupler 226. The couplers 222, 226 slidably mate, and one or both has a flexible sealing gasket to seal the connection, at least when a vacuum is drawn through the conduits 220, 224. Thus, as the portable vacuum unit 46 is placed within the cabinet 12, as for example to rest on the ledges 48, the male coupler 226 is simultaneously received within the female coupler 222 to automatically connect the conduit 38 to the vacuum port 92.

It is further contemplated that an automatic power connection can be obtained upon docking the portable vacuum unit 46 to the cabinet 12 in at least a couple ways. In one alternative, the electrical cord 104 can be mounted on a spring-biased reel in the portable vacuum unit 46. When fully reeled in, only the plug 105 projects from the portable vacuum unit 46. The power socket 196 can be disposed within the lower compartment 44 so that as the portable vacuum unit 46 is docked (for example, to rest on the ledges 48), the plug 105 is simultaneously urged into the socket 196. In another alternative, a separate electrical coupling can be provided between the portable vacuum unit 46 and the cabinet 12, with a bypass circuit in the portable vacuum unit to bypass the electrical cord 104 for delivery of power to the vacuum motor 92.

Figure 18A:
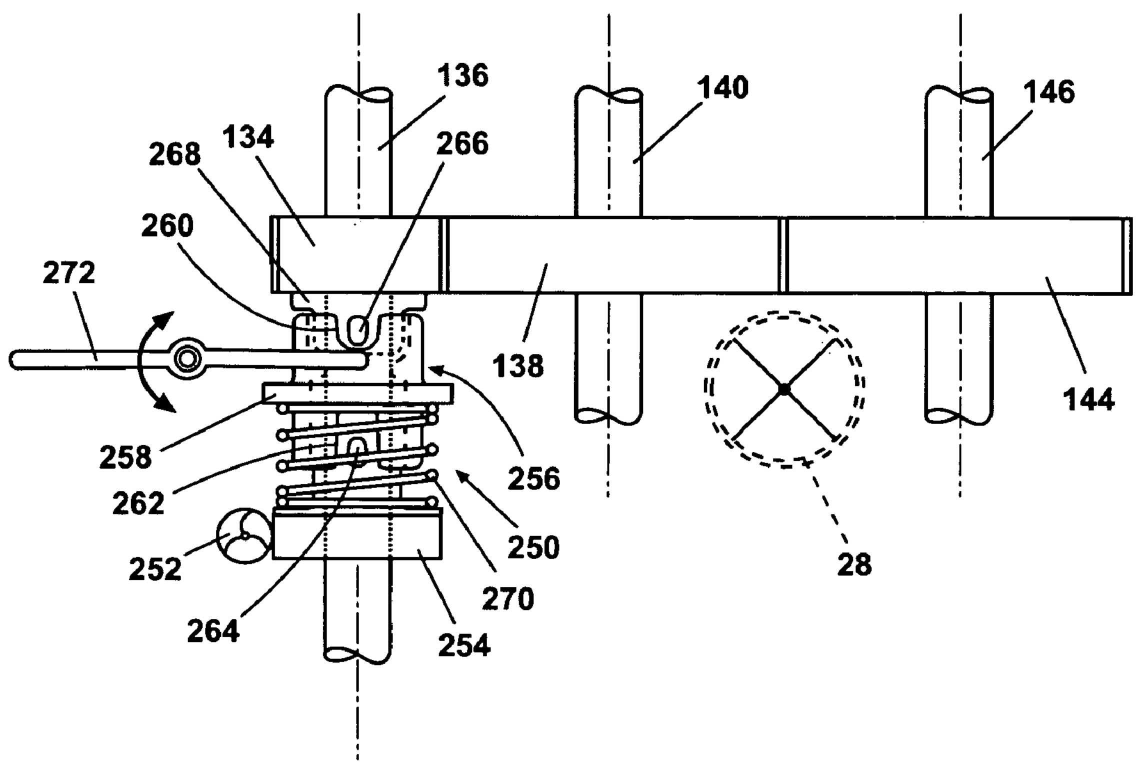
FIG. 18A is a partial plan view of the gearbox showing a clutch mechanism and the engaged position according to the invention.
Figure 18B:
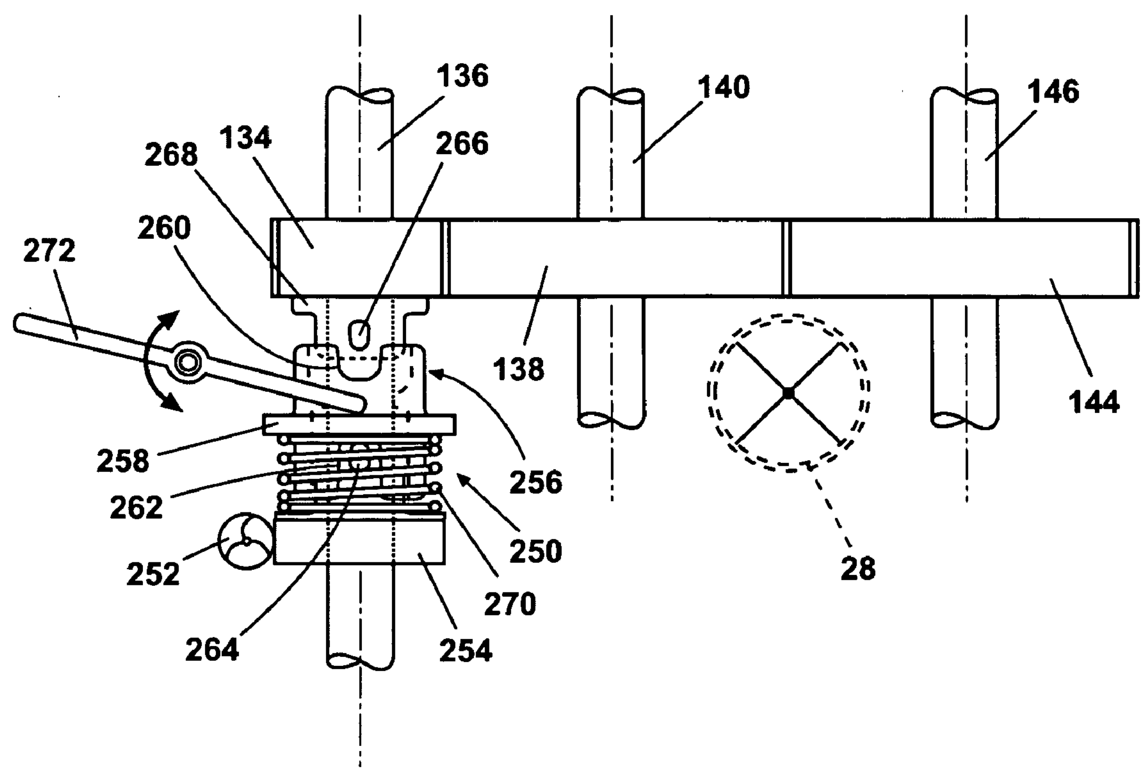
FIG. 18B is a partial plan view of the gearbox showing a clutch mechanism of FIG. 18A in the disengaged position.
Figure 18C:
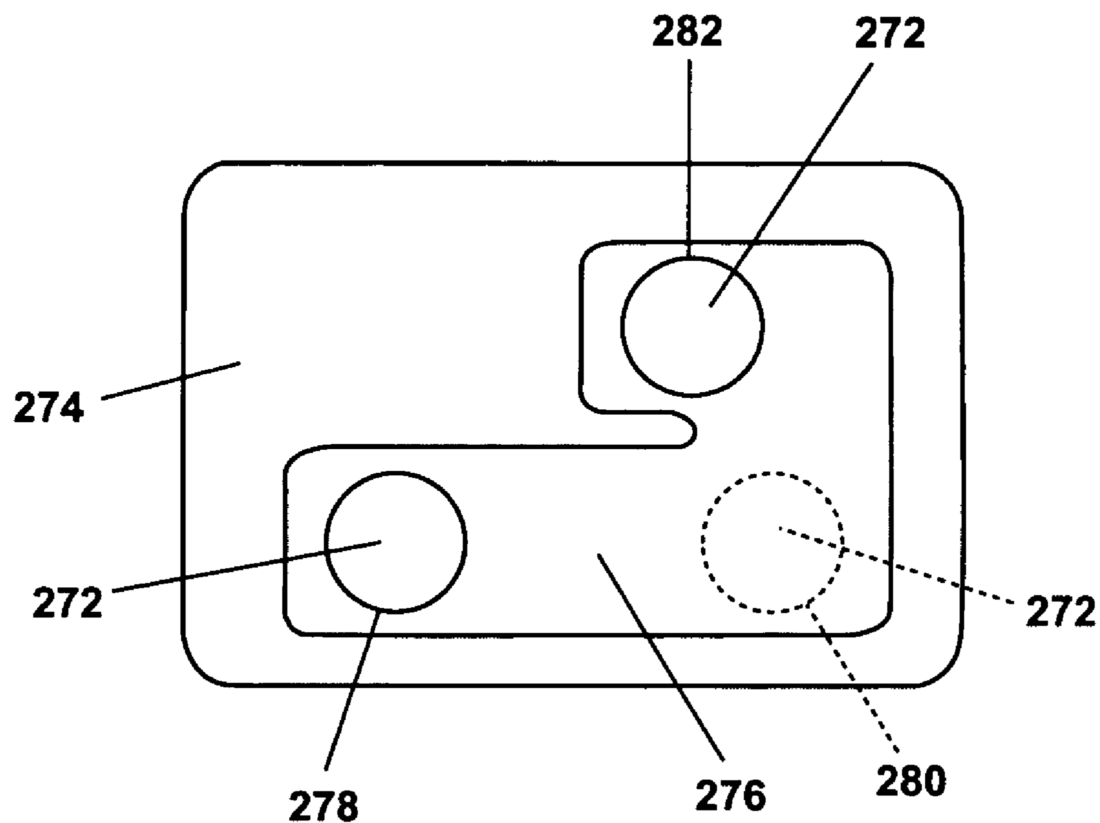
FIG. 18C is a plan view of the control plate for the clutch mechanism of FIGS. 18A and 18B.

It has been found desirable to provide a clutch mechanism to disengage the vacuum hose 28 from the reversible drive motor 132 so that it can be manually extended or retracted, for example in the event of the power failure. An embodiment of such a clutch mechanism is illustrated in FIGS. 18A-C. FIGS. 18A and 18B illustrate the three shafts 136, 140, and 146 on which the spur gears 134, 138, and 144 are respectively mounted. The vacuum hose 28 is shown in its relative position. The drive spur gear 134 has a clutch mechanism 250 interposed between it and the worm 252 on the shaft of the reversible drive motor 132. The worm 252 engages a worm gear 254 mounted on the shaft 136 and spaced from the drive spur gear 134. One of the worm gear 254 and the drive spur gear 134 rotates freely on the shaft 136; the other is fixed and rotates with the shaft 136. A generally cylindrical coupler 256 is slidably mounted on the shaft 136 between the worm gear 254 and the drive spur gear 134. The coupler 256 has an intermediate radial flange 258, with a spur keyway 260 on the cylindrical wall facing the drive spur gear 134, and a worm keyway 262 on the cylindrical wall facing the worm gear 254. A worm key 264 extends from the shaft 136 and into the worm keyway 262. A spur key 266 extends from a collar 268 on the drive spur gear 134, and is sized to be received within the spur keyway 260. The coupler 256 is biased by a compression spring 270 (between the worm gear 254 and the radial flange 258) so that the spur key 266 is received by the spur keyway 260, as shown in FIG. 18A. When the coupler 256 is so positioned, the drive spur gear 134 rotates with the worm gear 254.

A lever 272 is pivotally mounted to the gear box 122 so that one arm bears against the radial flange 258 and the other arm (either directly or by linkage) projects through a control plate 274 (see FIG. 18C). The control plate 274 has an L-shaped slot 276 where the lever 272 can be moved between an engaged position 278 and a disengaged position 280. The "L" portion of the slot 276 can provide for a hold position 282 where the lever can be retained in a disengaged position.

Looking now at FIG. 18A, it can be seen that when the lever 272 is in the engaged position 278, the coupler 256 is biased so that the spur key 266 is received in the spur keyway 260, thus engaging the vacuum hose 28 with the reversible drive motor 132. Looking now at fig year 18B, it can be seen that when the lever 272 is in a disengaged position 280, the arm bears against the radial flange 258 to urge the coupler 256 away from the drive spur gear 134 so that the spur key 266 is out of the spur keyway 260. In this position, the drive spur gear 134 is free to rotate relative to the worm gear 254, and consequently free to rotate relative to the reversible drive motor 132. Thus, the vacuum hose 28 is disengaged from the reversible drive motor 132 and free to be manually retracted or extended as desired. In the hold position 282, the lever 272 is retained in a disengaged position against the bias of the compression spring 270.

While the invention has been specifically described in connection with certain specific embodiments thereof, it is to be understood that this is by way of illustration and not of limitation, and the scope of the appended claims should be construed as broadly as the prior art will permit.

What is claimed is:

1. A vacuum system comprising a cabinet adapted to be mounted to a wall a hose connectable to a vacuum source and extendable from the cabinet between a retracted position where most of the hose is within the cabinet and an extended position where most of the hose is out of the cabinet, a rotatable shaft that drives the hose between the retracted and extended positions, a power source to cause the rotatable shaft to rotate, a sensor capable of measuring the speed of the shaft as it rotates, and a controller programmed to turn off the power to the rotatable shaft when the measured speed drops below a predetermined threshold while the hose is being extended or retracted and not at the retracted or extended positions.

2. The vacuum system according to claim 1 wherein the power source is a motor.

3. The vacuum system according to claim 2 wherein the sensor is a Hall effect sensor.

4. The vacuum system according to claim 1 further comprising a hose storage compartment in the cabinet where the hose is stored when the hose is in the retracted position.

5. The vacuum system according to claim 1 further comprising a retraction stop mechanism to limit retraction of the hose.

6. The vacuum system according to claim 5 further comprising an extension stop mechanism to limit extension of the hose.

7. The vacuum system according to claim 1 wherein a handle is mounted to the hose and is retained out of the cabinet when the hose is in the retracted position.

8. The vacuum system according to claim 7 wherein the handle has a light.

9. The vacuum system according to claim 7 wherein the handle has a nozzle portion and a grip portion, wherein the nozzle portion is angled relative to the grip portion.

10. The vacuum system according to claim 9 wherein the handle nests within a collar on a top wall of the cabinet.

11. The vacuum system according to claim 7 wherein the handle is canted relative to the cabinet for ease of access.

12. The vacuum system according to claim 1 further comprising a portable vacuum unit detachably mountable to the cabinet and having a tank and an inlet port in fluid communication with the tank, wherein the hose is connectable to the inlet port and the vacuum source is located in the portable vacuum unit to draw air from the inlet port into the tank.

13. The vacuum system according to claim 12 wherein the hose and the inlet port are automatically connected when the portable vacuum unit is docked to the cabinet.

14. The vacuum system according to claim 12 wherein the cabinet has a power outlet and the portable vacuum unit receives power from the power outlet when it is docked with the cabinet.

15. The vacuum system according to claim 14 wherein the portable vacuum unit has a power switch operable to actuate the vacuum source when the portable vacuum unit is detached from the cabinet, and a bypass mechanism to bypass the power switch when the portable vacuum unit is docked with the cabinet.

16. The vacuum system according to claim 15 wherein the vacuum source and the power outlet are automatically connected when the portable vacuum unit is docked with the cabinet.

17. The vacuum system according to claim 2 wherein the motor is operable in response to actuation of switches on the hose.

18. The vacuum system according to claim 17 wherein the hose has a handle and the switches are in the handle.

19. The vacuum system according to claim 18 wherein the switches actuate the motor by wireless signals.

20. The vacuum system according to claim 1 further comprising a clutch mechanism to release the hose so that it can move independently of the power source.

* * * * *